United States Patent

Katcher

[15] 3,706,258

[45] Dec. 19, 1972

[54] ENVIRONMENTAL SAFE AND ARM DEVICE FOR IGNITER FOR ROCKETS AND MISSILES

[72] Inventor: Emanuel Edward Katcher, Washington, D.C.

[73] Assignee: The United States of America as represented by the Secretary of the Navy

[22] Filed: Jan. 25, 1971

[21] Appl. No.: 112,491

[52] U.S. Cl. ................89/1.812, 89/1.813, 102/70, 102/81
[51] Int. Cl. ................................................F41f 3/04
[58] Field of Search ............102/81, 70, 7; 235/201; 89/1.812, 1.813

[56] References Cited

UNITED STATES PATENTS 3,066,605  12/1962  Jones..................................102/81 X
3,568,602  3/1971  Warren ................................102/81
3,077,524  2/1963  Blackburn..........................102/81 X
2,961,955  11/1960  MacDonald..............................102/7

Primary Examiner—Samuel W. Engle
Attorney—R. S. Sciascia, Q. E. Hodges and R. M. Wohlfarth

[57] ABSTRACT

A safety switch and arming device used on the igniters of aircraft carried rockets and missiles. The device utilizes a pitot tube to sense when the launching ship has reached a minimum safe launch speed. At that point the switch in the igniter circuit is closed and the ordnance can be launched.

1 Claim, 1 Drawing Figure

PATENTED DEC 19 1972
3,706,258
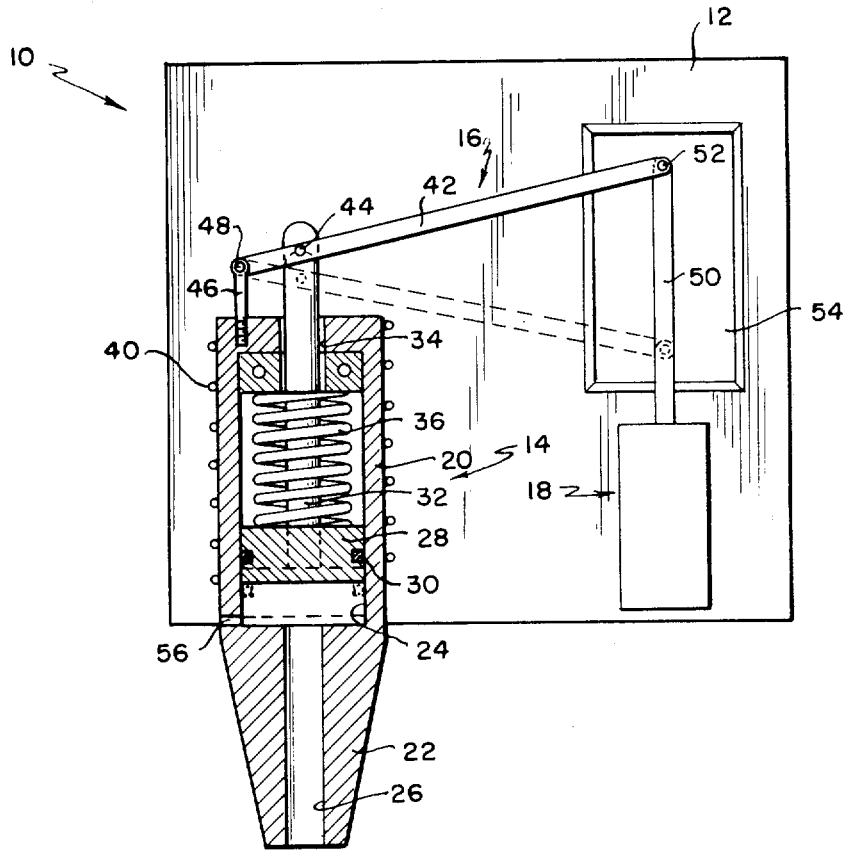
INVENTOR.
EMANUEL E. KATCHER
BY
ATTORNEYS

ENVIRONMENTAL SAFE AND ARM DEVICE FOR IGNITER FOR ROCKETS AND MISSILES

The invention described herein may be manufactured and used by or for the Government of the United States of America for governmental purposes without the payment of any royalties thereon or therefor.

BACKGROUND OF THE INVENTION

1. Field of the Invention

All ordnance carried and launched from an aircraft require intricate circuitry in the aircraft and on the ordnance to permit testing of the circuitry involved in the launch cycle. Also, there must be measures built in and procedures followed to prevent inadvertent launching of the ordnance either when the plane is at rest or at lower speeds such as when landing or taking off. Often during test procedures parts of the launch circuitry are activated and ignition can occur to a great part of the circuitry being collectively activated, or indiscriminate use of overrides to safety devices.

In addition, ignition can occur due to electromagnetic radiation, stray voltage, lightning transients, etc.

2. Prior Art

Present methods and apparatus for ignition of rockets and missiles launched from an aircraft do not contain an environmental control factor to assist in closing the igniter circuit. The igniter circuits are usually closed by manually controlled safety and arming mechanisms or the circuits are closed by mechanical-electrical relay systems activated by the pilot.

The prior art found does not contain an environmentally controlled safety and arming mechanism for igniters for aircraft launched ordnance when ignition is by an electrically initiated igniter.

SUMMARY OF THE INVENTION

The invention concerns a safety and arming mechanism that is environmentally controlled or activated. Specifically, a pitot tube is mounted on the ordnance to be launched or on the launch craft with a piston in the tube. While in flight, the force of the air through the pitot will act on the piston to drive it backward to actuate a switch in the igniter circuit.

BRIEF DESCRIPTION OF THE DRAWING

The FIGURE is a plan view of the subject invention.

DESCRIPTION OF THE INVENTION

Referring now to the drawing, the arming device 10 is shown mounted on a plate or housing 12. The device 10 and the housing 12 comprise a compact unit that is suitable for easy mounting on ordnance or on an aircraft.

The arming device 10 includes a pitot unit 14 and a linkage 16 connecting the pitot unit to a switch 18. The pitot unit 14 has an elongated cylindrical barrel 20 with a tapered end 22. The barrel 20 has a cylindrical opening 24 and connected thereto is a smaller cylindrical opening 26 leading to the tapered end 22. A piston 28 is mounted for travel in the opening 24 and is sealed thereinto by an O-ring seal 30. A piston rod 32 is attached to the piston 28 and extends through an opening 34 in the barrel 20 to guide the piston along the opening 24. A spring 36 is mounted on the piston rod 32 between the piston 28 and a rebound block 38 to bias the piston 28 and rod 32 into the position shown in dashed lines. Due to the extreme altitudes and low temperatures encountered, provision is made for de-icing by enclosing the barrel 20 with a heating coil 40.

The linkage 16 translates and augments the motion of the piston rod 32 for use by the switch 18 and has a main lever 42 that is pivotally mounted near one end thereof to the free end of the piston rod 32 by a hinge pin 44. The end of the lever 42 nearest piston rod 32 is anchored by an eye bolt 46. The eye bolt 46 is threaded into the end of the barrel 20 with the end of the lever 42 attached thereto by pivot pin 48. Thus, a relatively small increment of movement of the piston rod 32 will result in a large increment of movement of the other end of lever 42.

The switch 18 can be any of the conventional switches used in igniter circuitry with an actuator rod 50 extending therefrom. The rod 50 is attached to the end of lever 42 by a pivot pin 52. Thus, movement of the piston rod 32 will pivot lever 42 about pin 48 and pull rod 50 out of the switch 18 to actuate the switch mechanism thereby closing it and completing the igniter circuitry.

For convenience and ease of visual checking a window 54 can be provided in the housing 12 to check the position of the switch rod 50. Also, a drain 56 can be provided for the cylindrical opening 24 to permit drainage of moisture and condensation, etc.

The operation of the device is relatively simple and straightforward. The pitot assembly is mounted so that the tapered end 22 of the barrel 20 faces into the relative wind of the moving aircraft and its ordnance to be launched. The spring constant of spring 36 is chosen such that the piston 28 and rod 32 will remain in the dashed position until the plane reaches a safe enough speed to launch the ordnance. When the aircraft and ordnance reach this speed the wind force will have driven the piston and rod into the position shown in the drawing. The linkage 16 will have translated and augmented this movement to pull the rod 50 out and actuate the switch 18 thereby completing the igniter circuit of the ordnance to permit launch. With this device mounted on the aircraft or its ordnance there cannot be an inadvertant launching until the aircraft has achieved a certain minimum speed.

Obviously many modifications and variations of the present invention are possible in the light of the above teachings. It is therefore to be understood that within the scope of the appended claims the invention may be practiced otherwise than as specifically described.

What is claimed is:

1. An arming device in the igniter circuitry for rockets and missiles, comprising:
    an elongated cylinder with a wind velocity sensing opening at one end thereof exposed directly to the outside of the rocket;
    a piston movable in the cylinder in response to wind velocity sensed by the opening;
    a spring mounted within said cylinder in contact with said piston to bias the piston into a rest position near the wind velocity sensing opening of said cylinder;
    a piston rod attached to the piston and extending out the cylinder opposite to the wind velocity sensing opening;

a switch mounted in the igniter circuitry of the rocket;

a lever having one end pivotally mounted near the piston rod, connected to said piston rod in a position remote from said pivotal point and the other end of said lever pivotally mounted to the switch whereby movement of the piston away from the sensing opening will actuate the switch; and a heating coil surrounding said cylinder to deice said cylinder at extreme altitudes and corresponding low temperatures.

* * * * *